UNITED STATES PATENT OFFICE.

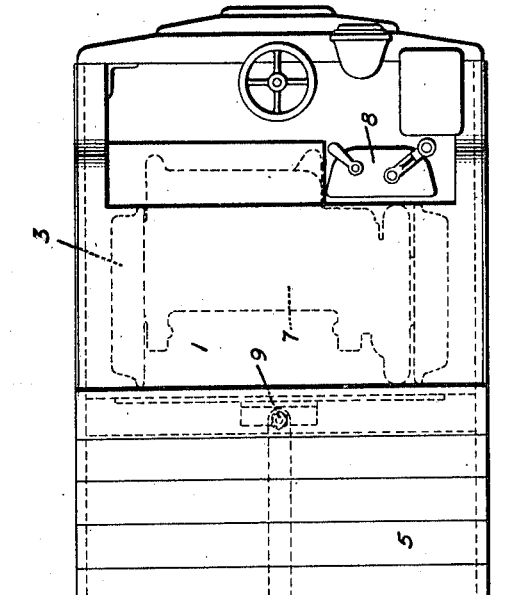
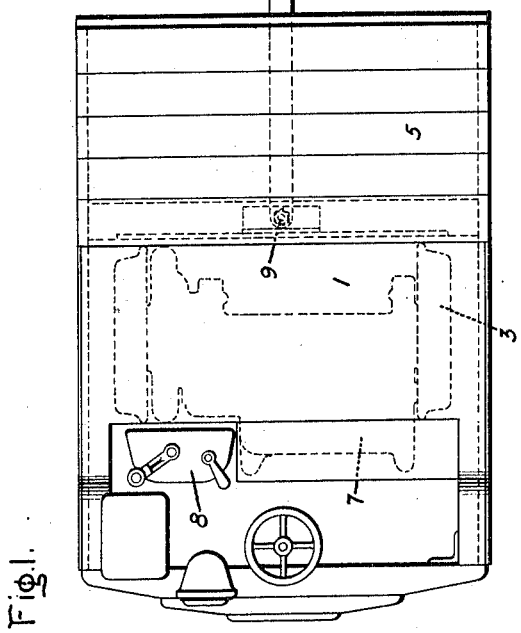
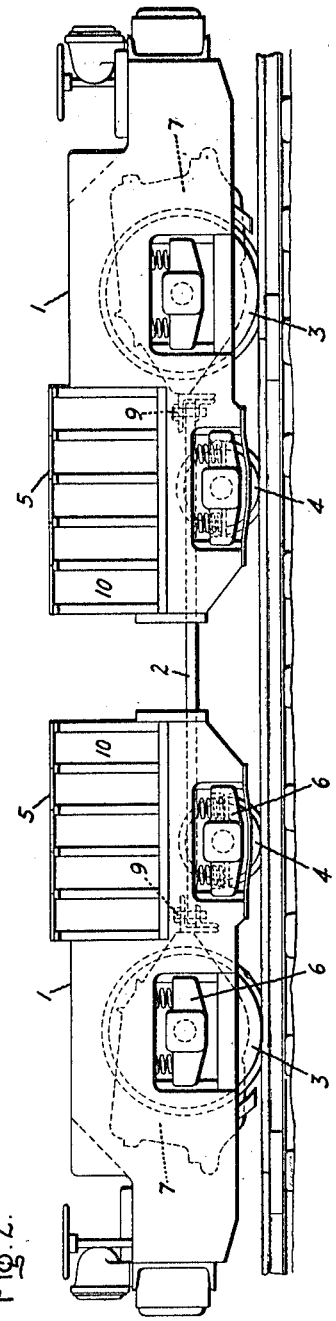

CARL W. LARSON AND GEORGE H. SHAPTER, OF ERIE, PENNSYLVANIA, ASSIGNORS TO GENERAL ELECTRIC COMPANY, A CORPORATION OF NEW YORK.

STORAGE-BATTERY LOCOMOTIVE.

1,270,628.

Specification of Letters Patent. Patented June 25, 1918.

Application filed April 13, 1917. Serial No. 161,883.

*To all whom it may concern:*

Be it known that we, CARL W. LARSON and GEORGE H. SHAPTER, citizens of the United States, residing at Erie, county of Erie, State of Pennsylvania, have invented certain new and useful Improvements in Storage-Battery Locomotives, of which the following is a specification.

Our invention relates to storage battery locomotives and is particularly applicable to such locomotives for use in mines. It has for its object, a novel arrangement of parts whereby a simple and cheap locomotive may be produced, which will be low enough to be used in mines having low entries or rooms and still have sufficient room for a storage battery capable of supplying sufficient power to operate the motors at proper speed throughout the working day.

The various features of novelty, which characterize our invention, are pointed out with particularity in the claim annexed to and forming a part of this specification. For a better understanding of our invention, reference may be had to the following description taken in connection with the accompanying drawing, in which Figure 1 is a plan view of a locomotive embodying our invention, and Fig. 2 is a side view of the locomotive of Fig. 1.

In the drawing, our locomotive is shown as comprising two units or sections 1, 1 pivotally connected together by means of a draw bar 2. Each section 1 comprises two large driving wheels 3, two undriven wheels 4 smaller in diameter than the wheels 3, and a storage battery 5 rigidly mounted on and carried by said section above the undriven wheels 4. The two sections of the locomotive are similar in construction, and each section has a stepped truck frame member 6, which is spring-supported in any well known manner on the axles, to which the wheels 3 and 4 are fastened. The large wheels 3 are driven by means of electric motors 7 through suitable gearing.

The large wheels 3 are located beyond the boundary of the storage battery 5, but the small wheels 4 are under the battery 5 so that substantially all the weight of the battery is carried by the undriven wheels. This arrangement permits the height of the locomotive to be determined by the diameter of the small undriven wheels and the height of the storage battery, the height of the locomotive over the undriven wheels being substantially no greater than that over the large wheels. Such a construction of locomotive permits the use of a storage battery large enough to supply all the necessary power to the motors 7 and at the same time keeps the height of the locomotive so low that it will enter very low entries or rooms in mines.

The locomotive is shown as being provided with controllers 8, one at each end thereof. These controllers are connected up to the motors 7 in the usual manner, and either controller may be used to control both motors.

The draw-bar 2 is pivotally connected to the sections 1 by means of king pins 9. The storage battery on each section of the locomotives is rigidly mounted on and carried by the stepped down portion of the truck frame member 6 and is surrounded by a box-like structure 10, to keep it in place. The center of gravity of the storage battery may be directly over the axle to which the small wheels are attached or it may be located between said axles.

We desire it to be understood that our invention is not limited to the particular arrangement shown and described, and we aim in the appended claim to cover all modifications which do not depart from the spirit and scope of our invention.

What we claim as new and desire to secure by Letters Patent of the United States, is:—

A storage battery locomotive having two pivotally connected units, each unit comprising a stepped frame having two large driving wheels, a motor for driving the same, two undriven wheels of smaller diameter than said first mentioned wheels mounted under the stepped down portion of said frame, and a storage battery of sufficient capacity to supply said motor rigidly mounted on said stepped down portion of the frame so that substantially all the weight thereof is carried by the undriven wheels; the height of said battery being proportioned so as not to be substantially higher than the stepped up portion of said frame.

In witness whereof, we have hereunto set hands this eleventh day of April, 1917.

CARL W. LARSON.
GEORGE H. SHAPTER.